United States Patent [19]

Dates et al.

[11] 4,194,042

[45] Mar. 18, 1980

[54] METALLIZED GLASS-CERAMIC COOKING VESSELS EXHIBITING EXTENDED SERVICE LIFE

[75] Inventors: Harold F. Dates; Joseph E. Nitsche, both of Corning, N.Y.

[73] Assignee: Corning Glass Works, Corning, N.Y.

[21] Appl. No.: 944,299

[22] Filed: Sep. 21, 1978

[51] Int. Cl.$^2$ .............................................. B32B 15/04
[52] U.S. Cl. .................................... 428/332; 220/455; 220/454; 427/423; 428/937; 428/433; 428/432; 428/457; 428/450
[58] Field of Search ............... 428/433, 332, 432, 450, 428/457, 937; 427/205, 225, 226, 287 B, 423; 220/454, 455

[56] References Cited

U.S. PATENT DOCUMENTS

| | | | |
|---|---|---|---|
| 2,053,923 | 9/1936 | Stewart | 427/101 |
| 3,523,013 | 8/1970 | Small | 428/633 |
| 3,927,243 | 12/1975 | Theisen | 428/433 |
| 4,050,956 | 9/1977 | Bruin | 428/433 |
| 4,056,650 | 11/1977 | Dates | 428/433 |

*Primary Examiner*—Ellis P. Robinson
*Attorney, Agent, or Firm*—Kees van der Sterre; Clinton S. Janes, Jr.

[57] ABSTRACT

Aluminum-coated glass-ceramic cooking vessels exhibiting extended service life under use conditions are provided by limiting the ultimate tensile strength of the heat-distributing aluminum coating.

4 Claims, No Drawings

METALLIZED GLASS-CERAMIC COOKING VESSELS EXHIBITING EXTENDED SERVICE LIFE

BACKGROUND OF THE INVENTION

The present invention is in the field of metallized glassware and specifically relates to metallized glass-ceramic cookware exhibiting excellent range top cooking performance in combination with extended service life.

It is known to apply a thin metallic layer to the base of a glass vessel to reduce the incidence of thermal shock breakage which can occur, for example, when the heated vessel is placed on a cold surface. Hence, U.S. Pat. No. 2,053,923 to Stewart describes a glass vessel with a thin metallic bottom coating (e.g., a 0.003-inch thick coating of aluminum) which is of sufficient thickness to improve heat diffusion and dissipation as well as to add mechanical strength to the vessel.

It is also known to apply relatively thick metallic layers to glass-ceramic vessels to improve the heat distribution characteristics thereof in use, as shown, for example, by U.S. Pat. No. 3,523,013 to Small. Glass-ceramic materials are semicrystalline ceramic materials, which are produced by the controlled crystallization of glasses comprising so-called nucleating agents. Families of glass-ceramics are known which exhibit dense white opacity, high strength, and very low thermal expansion, so as to be eminently suitable for the manufacture of heat-resistant overware. Unfortunately, however, the thermal conductivity of glass-ceramic materials suitable for this use is low; therefore, even though they are not prone to thermal breakage, they are not readily adaptable to range top use because of very uneven temperature distribution when subjected to localized heating by a burner element.

As noted in U.S. Pat. No. 4,056,650 to Dates et al., substantial problems arise when it is attempted to join aluminum metal to low-expansion glass-ceramic cooking vessels, due to the very large difference in thermal expansion between these materials. Hence, metallic aluminum has a coefficient of thermal expansion of about $230 \times 10^{-7}/°C.$, while glass-ceramics of the kind useful for cooking applications have coefficients of thermal expansion below about $25 \times 10^{-7}/°C.$, The thermal stresses arising from this expansion mismatch over the range of temperatures encountered by cookware can theoretically approach 100,000 psi in the use of thick coatings (on the order of about 18 mils or more), a stress level which can cause cooking vessel failure in use. Yet a coating thickness of at least about 18 mils is necessary to impart adequate heat-distributing characteristics to an aluminum-coated glass-ceramic cooking vessel of conventional thickness.

In addition to the problem of thermal breakage attributable to stress applied by the aluminum coating, the service life of aluminum-coated glass-ceramic cooking vessels is limited by cracking and/or separation of the aluminum coating from the vessel. This behavior is also attributed to the large difference in thermal expansion and contraction between the vessel and the coating in use.

According to the teachings of the aforementioned Dates et al. patent, substantial improvements in the thermal durability and thermal shock resistance of aluminum-coated glass-ceramic cookware may be obtained by using a powder flame spraying process to apply the aluminum coating to the glass-ceramic vessel. In addition, the service life of the vessel may be extended by treating the aluminum coating with certain chemical agents prior to use.

Notwithstanding these improvements, the service life of aluminum-coated glass-ceramic cooking vessels is still not as great as would be desired. Moreover, the use of prior art chemical treatments to enhance vessel durability adds to the complexity of the manufacturing process and can increase the cost of a vessel to a level where it may not be competitive with other cookware designed for range top use.

It is therefore a principal object of the present invention to provide an economical aluminum-coated glass-ceramic cooking vessel exhibiting significantly improved service life. Other objects and advantages of the invention will become apparent from the following description thereof.

SUMMARY OF THE INVENTION

The present invention is founded upon the discovery that a strong correlation exists between the ultimate tensile strength of the aluminum metal applied to the glass-ceramic vessel to form the coating and the service life of the resulting aluminum-coated vessel. Test data suggest that long service life under thermal cycling conditions, such as are encountered in use as cookware, is favored when a relatively weak (low tensile strength) coating rather than a strong (high tensile strength) coating is employed.

The ultimate tensile strength of aluminum applied to a substrate as a coating depends upon the composition and structure of the aluminum, which is in turn dependent to a large extent on the method by which the coating is applied. As an indication of the ultimate tensile strength obtainable in sprayed aluminum coatings, a published value for sprayed aluminum from a Metco Type 2E (wire flame) spraygun is about 19,500 psi. *Metco Metallizing Handbook*, H. S. Ingham et al., Volumes I and II, pages A-59 to A-62, Metallizing Engineering Co., Inc., Westbury, L. I., New York (1959).

According to the present invention, aluminum-coated glass-ceramic cooking vessels exhibiting extended service life are obtained when the ultimate tensile strength of the sprayed aluminum coating applied to the vessel is reduced to a value in the range of about 500–3000 psi. Thus the invention encompasses an improvement in an article of glass-ceramic cookware, which article comprises a glass-ceramic vessel composed of a lithium aluminosilicate glass-ceramic material, that material having a thermal expansion coefficient not exceeding about $25 \times 10^{-7}/°C.$, and which article further comprises an aluminum coating bonded to at least a portion of the surface of the vessel, having a thickness of at least about 18 mils. According to that improvement, the coating of metallic aluminum which is bonded to the vessel is formed of sprayed aluminum having an ultimate tensile strength in the range of about 500–3000 psi.

DETAILED DESCRIPTION

Glass-ceramic cooking vessels which can be used to provide aluminum-coated vessels with long service life include any of the low-expansion vessels useful for cookware applications known to the art. By a low-expansion vessel is meant a vessel composed of a glass-ceramic material with a thermal expansion coefficient not exceeding about $25 \times 10^{-7}/°C.$ (conventionally taken as the average linear thermal expansion value over the temperature range from about room temperature to about 300° C.). Low thermal expansion is a property which is required to impart high thermal shock resistance to the aluminum-coated vessel.

The glass-ceramic materials most commonly used in the prior art for the manufacture of glass-ceramic cookware are lithium aluminosilicate glass-ceramics, such as described, for example, in the aforementioned U.S. Pat. No. 4,056,650 to Dates et al. That patent is expressly incorporated herein by reference for a description of the most preferred glass-ceramic vessels for this use.

The vessel selected for coating may have any shape which is suitable for range top or oven use, including any of the conventional saucepan, skillet, or teapot configurations. The glass-ceramic material forming the vessel may be transparent, translucent, or opaque, and may be white or colored.

The sprayed aluminum metal coating which is applied to the vessel should have a thickness of at least about 18 mils in order to impart heat diffusing characteristics which are adequate for range top use. In a preferred embodiment, the coating has a thickness in the range of about 20-30 mils.

In theory, any of the known aluminum spraying methods, including but not being limited to plasma arc spraying, wire flame spraying, or powder flame spraying techniques, may be modified or adapted to provide sprayed aluminum having the very low tensile strength values necessary for the production of aluminum-coated cooking vessels in accordance with the invention. However, the use of a powder flame spraying method appears best adapted for this purpose, and is therefore strongly preferred.

Flame spraying process variables affecting the composition and structure of the sprayed aluminum, and therefore the tensile strength of the applied coating, include oxygen flow rate, fuel gas (e.g., hydrogen) flow rate, aluminum powder feed rate, aluminum powder carrier gas flow rate, substrate-spray gun standoff distance, spray gun scan velocity, and aluminum powder particle size. Hydrogen flow rate and spray gun standoff distance are among the more important factors. For the present purposes, hydrogen is the preferred fuel gas and nitrogen is the preferred aluminum powder carrier gas.

The precise effect of varying any one of these process variables during the powder flame spraying process will of course depend partly on the absolute values of the other parameters. However the usual effect of such variations, for the variables which we have found have significant effects upon the ultimate tensile strength of the sprayed aluminum, are set forth in Table I below.

TABLE I

| Process Variable | Variable Change | Tensile Strength Change |
|---|---|---|
| H$_2$ flow rate | Increase | Increase |
| Spray Gun Standoff | Increase | Decrease |
| Al powder feed rate | Increase | Decrease |
| Al Powder Particle Size | Increase | Increase |
| N$_2$ flow rate | Increase | Decrease |
| Spray gun scan rate | Increase | Decrease |

Of course, the effects noted above are based upon variances from standard spraying conditions such as are shown in the detailed example of the invention hereinafter set forth; the actual magnitude and/or direction of the changes resulting from such variances in other cases may readily be determined by routine experiment.

The determination of the ultimate tensile strength of sprayed aluminum to be applied as a coating to a glass-ceramic vessel according to the invention may be determined by any one of many well known techniques. One commonly used method is to direct the aluminum spray onto a prepared base under conditions similar to those to be used in manufacture, and then to remove the base and test the sprayed metal with suitable tensile testing equipment. (See, for example, the *Metco Metallizing Handbook*, supra, pages A-59, A-60).

For the purpose of the present description, the ultimate tensile strength of a sprayed aluminum forming a coating is that obtained by applying the sprayed aluminum to a Transite ® asbestos-containing base to form an aluminum sheet about 0.025-0.035 inches in thickness and about 8×8 inches in size. Thereafter, this sheet is removed from the base and is cut into strips about ½×5 inches in size. These strips are then necked down in center width to provide tensile testing samples having a gauge length about ¼ inch wide and 2 inches long in the middle of each sample. The samples are then tensile-tested in an Instron ® Model TM-SM tensile testing machine, manufactured by the Instron Corporation, Canton, Mass.

In the application of powder flame sprayed aluminum cooking vessel coatings according to the prior art, as exemplified in the aforementioned Dates et al. patent, the sprayed aluminum used for coating was provided using a commercially available powder flame spray gun (Metco Type 2P ThermoSpray ® Gun), which is suitable for flame-spraying aluminum powder with a hydrogen-oxygen flame. The aluminum powder selected for application with this spray gun consisted of Reynolds LSA 896 aluminum powder, a powder which is commercially available from the Reynolds Aluminum Company, Richmond, Va.

Spraying conditions used for applying this powder as a coating to glass-ceramic cooking vessels included a hydrogen flow rate to the spray gun of about 137 cubic feet/hour, an oxygen flow rate of 28 cubic feet/hour, an aluminum powder feed rate of about 40 grams/minute, and a spray gun standoff distance of about 6½ inches. Under these spraying conditions, sprayed aluminum samples tensile-tested substantially as above described exhibited an ultimate tensile strength value of about 6,000 psi.

This level of tensile strength, although substantially lower than is typically obtained by conventional wire flame spraying methods, has now been found to be significantly higher than should be used to obtain extended cooking vessel service life in home use. Glass-ceramic cooking vessels provided with such coatings perform relatively well with respect to thermal durability under the rather severe thermal cycling conditions used for evaluating coating durability in the prior art, those conditions comprising repeated cycling of a coated vessel from a hot (600° C.) electric burner element to cold (15° C.) water to induce coating failure. However, vessels of this type do not perform correspondingly well in a more recently devised accelerated cook test, hereinafter more fully described, which is less severe but which more closely approximates the actual conditions of home use.

We now attribute the relatively high ultimate tensile strength of the prior art powder flame sprayed aluminum cooking vessel coatings to the aluminum spraying conditions which were employed. A low gun stand-off distance was used, and the spray gun was relatively small and produced a tight flame spray pattern. The hydrogen and oxygen flow rates were relatively high for the size of spray gun employed, and the aluminum powder was gravity-fed so that no nitrogen carrier gas was used.

The superiority of lower tensile strength cooking vessel coatings from the standpoint of thermal durability has been established by an accelerated cook test which was designed to approximate the conditions of actual home use. In accordance with that test, aluminum-coated cooking vessels are repeatedly processed through a cooking cycle comprising cooking and washing operations under approximate use conditions until failure of the aluminum coating occurs. The accelerated cook test cycle comprises placing the skillet on a hot 2300-watt electric burner element, operating at a power level of 675 watts, while adding 40 ml of cooking oil to the skillet, heating the oil for 6 minutes, adding a thermal load consisting of 2 cups of water-wet wood chips to the hot oil, and heating the oil and chips for 5 minutes. Thereafter the chips are turned in the skillet with a spatula, heated for an additional 5 minutes, and finally discarded. The skillet is then scraped clean and washed under cold water with soap-filled steel wool pads in preparation for the next cooking cycle.

The primary cause of coating failure under thermal cycling conditions such as are encountered in the above-described cook test is cracking failure due to repeated expansion and contraction of the coating. As in the prior art hot burner-to-cold water test above described, a quantitative measure of the level of coating deterioration is obtained by rating the extent of cracking on a scale of 0–9, with 0 corresponding to no coating damage, 1–4 corresponding to increasing levels of microscopically detectable cracking damage, and 5–9 corresponding to increasing levels of visually observable cracking damage. A rating of 9 corresponds to substantial cracking of the coating or loss of coating metal by spalling, and constitutes a failure of the vessel.

Coating failure can also occur by lifting of the aluminum coating away from the vessel wall, with lifting damage being rated on a scale of 0–3. A lift rating of 0 corresponds to no lifted spots, a rating of 1 or 2 to increasing numbers of small lifted areas, and a rating of 3 to a loss of metal or the appearance of a substantial number or large area of lifted coating.

The correlation which was found to exist between the ultimate tensile strength of sprayed aluminum applied as a coating to a glass-ceramic cooking vessel and the ability of the coated vessel to withstand thermal cycling under the cooking conditions above described is illustrated by cook test data such as presented in Table II below. Test groups of glass-ceramic cooking vessels (each group comprising 4–6 glass-ceramic vessels) are provided with powder flame sprayed aluminum metal coatings, all coatings being at least 20 mils in thickness, under spraying conditions such as described in the Table. Samples of the sprayed aluminum used for coating the vessels in each group are tensile-tested as above described, and the average ultimate tensile strength (UTS) values, reported in pounds per square inch, are recorded.

The aluminum-coated vessels are then processed through the accelerated cook test above described, with the number of cycles to coating failure (a crack rating of 9 or a lift rating of 3) being noted for each vessel. The average number of cooking cycles to failure for each group is then reported as the cycle life of the coated vessel.

In each of the cases reported in the Table, a Metco Type 6P Thermo Spray gun is used to apply the sprayed aluminum coating, and the glass-ceramic vessels are preheated to a temperature in the range of 120°–650° C. prior to spraying. The conditions of spraying, which are reported as coating variables in the Table, include aluminum powder feed rate, in grams per minute, hydrogen burner gas flow, oxygen burner gas flow and nitrogen carrier gas flow, all in cubic feet per hour, and gun standoff distance, in inches.

TABLE II

| Group No. | 1 | 2 | 3 | 4 | 5 |
|---|---|---|---|---|---|
| Cycle Life (cycles) | 598 | 825 | 997 | 1,267 | 1,728 |
| Coating Strength (UTS-psi) | 7,300 | 3,703 | 2,286 | 1,559 | 1,396 |
| Coating Variables: | | | | | |
| Al feed rate (g/min) | 32 | 90 | 75 | 90 | 90 |
| $H_2$ flow rate ($f^3$/hr) | 238 | 293 | 214 | 214 | 214 |
| $O_2$ flow rate ($f^3$/hr) | 48 | 83 | 69 | 69 | 69 |
| $N_2$ flow rate ($f^3$/hr) | 21 | 27 | 23 | 27 | 27 |
| Gun Standoff (inches) | 9" | 9¾" | 9¾" | 9¾" | 9¾" |

Strength variations such as are demonstrated by Groups Nos. 4 and 5 of Table II, and by the coatings prepared according to the Example hereinafter set forth, are ordinarily attributed to variations in aluminum powder particle size from powder lot to powder lot, or within a lot due to changes occuring during powder shipment or handling.

Based on the correlation between the results of accelerated cook tests and the projected service life of aluminum-coated cooking vessels under the conditions of actual use, we believe that, depending on coating thickness, useful vessel service life can be assured if sprayed aluminum coatings having ultimate tensile strength values within the range of about 500–3000 psi are employed. However, optimum resistance to deterioration on thermal cycling, together with superior mechanical properties in the applied aluminum coating, appear to be obtained within the somewhat narrower tensile strength range of about 900–1600 psi. At tensile strength values in excess of 1600 psi, the probability of obtaining some vessels with reduced cycling durability increases, while at ultimate tensile strengths below 900 psi, mechanical finishing of the aluminum coating is complicated by the possibility of removing too much metal.

The invention may be further understood by reference to the following detailed example illustrating the manufacture of an aluminum-coated glass-ceramic cooking vessel in accordance therewith.

EXAMPLE

An aluminum spray suitable for producing an extended-life aluminum coating on a glass-ceramic cooking vessel is obtained using a commercially available powder flame spray gun, such as the Metco Type 6P ThermoSpray ® Gun. This gun is used to apply a commercially available aluminum powder such as Alcoa 108 aluminum powder purchased from the Aluminum Company of America.

Spraying conditions used for flame spraying this powder to form relatively low ultimate tensile strength sprayed aluminum include a hydrogen flow rate to the spray gun of about 214 cubic feet/hour, an oxygen flow rate of about 55 cubic feet/hour, an aluminum powder feed rate of about 90 grams/minute, and a spray gun standoff distance of about 9-¾ inches. The ultimate tensile strength of a sample of sprayed aluminum produced under these spraying conditions is about 1186 psi.

To provide an aluminum-coated glass-ceramic cooking vessel utilizing this sprayed aluminum, a circular glass-ceramic skillet about 10" in diameter and 2" in depth is selected for coating. This vessel is composed of a lithium aluminosilicate glass-ceramic material having an average linear coefficient of thermal expansion (0°–300° C.) of about $12 \times 10^{-7}/°C$.

The outside bottom of the glass-ceramic skillet which is to receive the aluminum coating is thoroughly washed with a detergent solution and rinsed, and then preheated to a temperature of about 650° C. The preheated bottom surface of the skillet is then coated with aluminum to a thickness of about 25 mils by the application of an aluminum metal spray provided under the spraying conditions above described. Thereafter, the aluminum coating is finished by brushing and buffing.

To evaluate the thermal durability of aluminum-coated glass-ceramic cooking vessels provided with coatings of sprayed aluminum having this tensile strength value, six vessels produced in accordance with the Example are tested using the accelerated cook test described above. The average number of cooking cycles to failure in this test for this group of vessels is 2097 cycles. The least durable vessel failed at 1790 cycles and the most durable vessel at 2412 cycles.

Of course, the foregoing Example is merely illustrative of techniques which could be employed to make durable aluminum-coated glass-ceramic cooking vessels in accordance with the invention. It is well known that the thermal durability of glass-ceramic cooking vessels having sprayed aluminum coatings can be modified or enhanced by special finishing techniques, such as the application of protective oxide films, and that the service life of the vessel is also affected by process variables such as vessel preheat temperature and the like. It is therefore within the scope of the present invention to utilize any of these known prior art techniques to further improve the performance characteristics of aluminum-coated glass-ceramic cooking vessels having low ultimate tensile strength aluminum coatings as hereinabove described.

I claim:

1. In an article of glass-ceramic cookware comprising a glass-ceramic vessel composed of a lithium aluminosilicate glass-ceramic material having a thermal expansion coefficient not exceeding about $25 \times 10^{-7}/°C$., at least a portion of the surface of said vessel having a sprayed coating of metallic aluminum having a thickness of at least about 18 mils bonded thereto, the improvement which comprises: forming the coating from sprayed aluminum having an ultimate tensile strength within the range of about 500–3000 psi.

2. An article of glass-ceramic cookware in accordance with claim 1 wherein the coating of metallic aluminum has a thickness in the range of about 20–30 mils.

3. An article of glass-ceramic cookware in accordance with claim 1 wherein the coating of metallic aluminum is provided by a powder flame spraying process.

4. An article of glass-ceramic cookware in accordance with claim 1 wherein the coating is formed from sprayed aluminum having an ultimate tensile strength within the range of about 900–1600 psi.

* * * * *